US007497229B2

(12) United States Patent
Tahir et al.

(10) Patent No.: US 7,497,229 B2
(45) Date of Patent: Mar. 3, 2009

(54) SEAL SUPPORT SYSTEM WITH DISCHARGING MEANS

(75) Inventors: Nadim Tahir, Rotherham (GB); Desmond Hall, Belfast (IE); James Frances McKeever, Belfast (IE)

(73) Assignee: AES Engineering Ltd (GB)

( * ) Notice: Subject to any disclaimer, the term of this patent is extended or adjusted under 35 U.S.C. 154(b) by 221 days.

(21) Appl. No.: 11/277,440

(22) Filed: Mar. 24, 2006

(65) Prior Publication Data

US 2006/0213574 A1  Sep. 28, 2006

(30) Foreign Application Priority Data

Mar. 24, 2005  (GB) ................. 0506096.7

(51) Int. Cl.
*F16K 21/04* (2006.01)
*F04C 29/12* (2006.01)
*F04B 39/02* (2006.01)
*F04B 39/04* (2006.01)

(52) U.S. Cl. ............... 137/391; 141/95; 141/198; 141/302; 277/408; 417/366

(58) Field of Classification Search ............ 141/82, 141/95, 198, 301, 302, 285; 277/358, 401, 277/431, 432, 408, 514; 222/61, 62, 67; 417/366, 368; 137/391
See application file for complete search history.

(56) References Cited

U.S. PATENT DOCUMENTS 3,831,381 A * 8/1974 Swearingen ............... 277/432
3,937,022 A * 2/1976 Swearingen ............... 60/657

(Continued)

FOREIGN PATENT DOCUMENTS

EP  1104867  6/2002

(Continued)

OTHER PUBLICATIONS

Patents Act 1977: Search under Section 17; Combined Search and Examination Report under Sections 17 & 18(3).

*Primary Examiner*—Timothy L Maust
*Assistant Examiner*—Nicolas A Arnett
(74) *Attorney, Agent, or Firm*—Ryan A. Schneider, Esq.; Troutman Sanders LLP

(57) ABSTRACT

A seal support system (1) for maintaining barrier fluid in a mechanical seal (2) including a vessel (10) for containing barrier fluid, a system for feeding barrier fluid between the vessel (10) and the mechanical seal (2), a system for automatically detecting barrier fluid within the vessel (10) and a system for automatically restoring barrier fluid within the vessel (10), and a system (100) for automatically draining barrier fluid from the vessel (10) after a predetermined period of time. The system for discharging (100) may automatically drain barrier fluid from the vessel (10) for a predetermined period of time. The system of discharging (100) may automatically drain barrier fluid from the vessel (10) with a predetermined rate of discharge. The system of discharging (100) preferably includes a system for draining barrier fluid from the vessel (10) and a valve for automatically controlling the draining of barrier fluid from the vessel. The valve may be an electrically controlled valve and the system of discharging (100) may further include a system of electric control for controlling the operation of the valve. The valve may alternatively be a mechanically controlled valve and the system of discharging (100) may further include a system of mechanical control for controlling the operation of the valve.

11 Claims, 5 Drawing Sheets

U.S. PATENT DOCUMENTS

| | | | |
|---|---|---|---|
| 4,858,937 A * | 8/1989 | Fairlie-Clarke et al. | 137/554 |
| 5,028,220 A * | 7/1991 | Holdsworth | 418/2 |
| 5,171,130 A * | 12/1992 | Kume et al. | 417/228 |
| 5,249,812 A * | 10/1993 | Volden et al. | 277/361 |
| 5,636,847 A * | 6/1997 | Ostrowski | 277/317 |
| 5,769,427 A * | 6/1998 | Ostrowski | 277/318 |
| 5,785,075 A * | 7/1998 | Uchida et al. | 137/115.1 |
| 6,210,107 B1 * | 4/2001 | Volden et al. | 415/170.1 |
| 7,258,143 B2 * | 8/2007 | Phipps et al. | 141/198 |
| 2003/0122323 A1 * | 7/2003 | Tahir et al. | 277/630 |
| 2005/0081952 A1 * | 4/2005 | Edward Phipps et al. | 141/198 |
| 2005/0184464 A1 * | 8/2005 | Tahir et al. | 277/348 |

FOREIGN PATENT DOCUMENTS

| | | |
|---|---|---|
| GB | 2381838 | 5/2003 |

* cited by examiner

SEAL SUPPORT SYSTEM WITH DISCHARGING MEANS

BENEFIT CLAIMS

This application claims the benefit of GB 0506096.7 filed 24 Mar. 2005.

FIELD OF THE INVENTION

This invention relates to a seal support system for maintaining barrier fluid within a mechanical seal. Embodiments of the invention relate to a seal support system having discharging means to avoid or reduce the stagnation of barrier fluid, the build-up of pathogens and/or contaminants in the barrier fluid.

BACKGROUND OF THE INVENTION

Mechanical seals typically comprise a rotating component which is secured to a rotatable shaft and a stationary component which is secured to a housing. The interface between the seal faces of the rotating component and stationary component prevents the processed product from escaping.

Unfortunately, heat is generated at the interface between the seal faces of the rotating and stationary components due to the rotating action of the rotary component against the stationary component. It is essential that the heat is removed from the seal faces because it may lead to excessive wearing of the seal faces, lead to unwanted leakage between the seal faces and may even cause the mechanical seal to fail prematurely. The problem of unwanted heated is usually overcome by providing a film of fluid between the seal faces so as to lubricate and cool the components.

Seal support systems are commonly used to provide a mechanical seal with the requisite lubricating and cooling fluid. Seal support systems typically comprise a vessel or tank, which contains a volume of fluid. The vessel is piped to a mechanical seal on a pump, mixer or item of rotating equipment in order to provide fluid within the mechanical seal and particularly to form a film of fluid between the seal faces. A return pipe is arranged to lead fluid back to the vessel from the mechanical seal, hence closing the "loop". This allows fluid repeatedly to enter and exit the mechanical seal, via the vessel. Such fluid is generally chosen so that it lubricates and cools the components within the mechanical seal, whilst being compatible with the process fluid.

The industry term of the fluid contained in the vessel and used to lubricate and cool the mechanical seal is "barrier" or "buffer" fluid.

As indicated above, seal support systems are well known and very effective in maintaining barrier fluid within a mechanical seal. One such system is described in UK Patent 2381838.

It has been found that it is difficult to ensure the vessel of a seal support system, and therefore the mechanical seal, remains sterile during use. Due to the closed loop arrangement the barrier fluid is recycled rather than discharged as waste immediately after cooling the mechanical seal. Hence, the barrier fluid is at risk of becoming stagnant within the vessel and/or contaminated and this may lead to the growth of pathogens such as bacteria, viruses and/or fungi. There are certain industries in which the sterility of machinery is essential, for example in the food, beverage or pharmaceutical industry. Accordingly, these industries are unable to use conventional seal support systems to maintain barrier fluid within a mechanical seal.

This problem has been overcome in the past by providing a seal support system with a manually operated discharge or flushing means. These typically include an outlet pipe from the vessel with a manually operated valve. The valve must be manually opened by a maintenance engineer once a day or as often as required in order to drain the vessel of barrier fluid.

However, the problem with such discharge means is that it is entirely reliant on manual operation. Hence, there is a risk that the seal support system is not sufficiently drained in order to avoid the stagnation of barrier fluid and ensure the barrier fluid remains pathogen and/or contaminate free. For example, the vessel may not be drained of barrier fluid as frequently as required. Nor may the vessel be drained for an appropriate period of time to ensure enough barrier fluid has been discharged. Alternatively, too much barrier fluid may be drained from the vessel leading to unnecessary wastage.

SUMMARY OF THE INVENTION

Embodiments of the present invention seek to overcome the problems associated with the prior art. The present invention particularly seeks to overcome the problems associated with a manually operated discharge or flushing means. Embodiments of the invention seek to avoid or reduce the stagnation of barrier fluid within the vessel of a seal support system and further seek to ensure the barrier fluid within the vessel of a seal support system is substantially pathogen and/or contaminant free. Embodiments of the invention seek to provide a seal support system that is sufficiently sterile for use in the food, beverage and/or pharmaceutical industry.

According to the invention, there is provided a seal support system for maintaining barrier fluid in a mechanical seal comprising a vessel for containing barrier fluid; feeding means for feeding barrier fluid between the vessel and the mechanical seal; detecting means for automatically detecting barrier fluid within the vessel; restoring means for automatically restoring barrier fluid within the vessel; and characterized in further comprising discharging means for automatically draining barrier fluid from the vessel after a predetermined period of time.

The present invention overcomes the problem of manually operated discharge or flushing means by providing discharge means that automatically drain the vessel of barrier fluid after a predetermined period of time.

By automating the draining of barrier fluid from the vessel the problems associated with manual operation are avoided. The draining of the barrier fluid is controlled such that it occurs as often as required. Thus, the stagnation of barrier fluid, growth of pathogens and/or contamination of the barrier fluid is substantially reduced or prevented.

Preferably, the barrier fluid detecting means comprises means for automatically detecting the level of barrier fluid within the vessel and the restoring means comprises means for supplying barrier fluid from a barrier fluid source to the vessel when the barrier fluid level is below a predetermined level. The means for supplying barrier fluid preferably comprises inlet means for feeding barrier fluid from the barrier fluid source to the vessel and a valve for automatically controlling the supply of barrier fluid from the barrier fluid source in response to the level of barrier fluid detected by the detecting means. The valve for automatically controlling the supply of barrier fluid optionally controls the supply of barrier fluid under pressure from the barrier fluid source.

Alternatively, the barrier fluid detecting means comprises means for automatically detecting the pressure of barrier fluid within the vessel and the restoring means comprises means for supplying barrier fluid under pressure from a barrier fluid source to the vessel when the pressure is below a predetermined pressure. In this case, the means for supplying barrier fluid comprises inlet means for feeding barrier fluid under pressure from the barrier fluid source to the vessel and a valve for automatically controlling the supply of barrier fluid under pressure from the barrier fluid source in response to the pressure of barrier fluid within the vessel detected by the detecting means.

The detecting means and valve for controlling the supply of barrier fluid may be configured as interconnected mechanical means. For example, the detecting means may comprise a float and the valve for controlling the supply of barrier fluid may be a ball-cock valve.

Alternatively, the detecting means and valve for controlling the supply of barrier fluid are configured as interconnected electrical devices.

The discharging means may automatically drain barrier fluid from the vessel for a predetermined period of time. Hence, a sufficient quantity of barrier fluid is drained so as to help reduce or prevent the stagnation of barrier fluid, contaminants and/or growth of pathogens. The discharging means may additionally or alternatively automatically drain barrier fluid from the vessel with a predetermined rate of discharge.

The discharging means preferably comprise outlet means for draining barrier fluid from the vessel; and a valve for automatically controlling the draining of barrier fluid from the vessel.

The valve for automatically controlling the draining of barrier fluid may be an electrically controlled valve and the discharging means may further comprise electric control means to control the operation of the valve. The electric control means preferably comprises a programmable timer, electrically connected to the valve for automatically controlling the draining of barrier fluid, automatically to control the opening and closing of the valve.

The valve for automatically controlling the draining of barrier fluid may instead be a mechanically controlled valve and the discharging means may further comprise mechanical control means to control the operation of the valve. The mechanical control means may comprise a programmable timer, mechanically connected to the valve for automatically controlling the draining of the valve, automatically to control the opening and closing of the valve. Alternatively, the mechanically controlled valve is a hydraulically balanced valve and the mechanical control means comprises a hydraulic chamber automatically to control the opening and closing of the hydraulically balanced valve and arranged in fluid connection with the vessel, means for controlling the rate of flow of barrier fluid into the hydraulic chamber from the vessel and discharging means for discharging barrier fluid from the hydraulic chamber.

BRIEF DESCRIPTION OF DRAWINGS

For a better understanding of the present invention and to show how it may be carried into effect, reference shall now be made, by way of example, to the accompanying drawings in which.

DETAILED DESCRIPTION OF THE INVENTION

Figure 1:
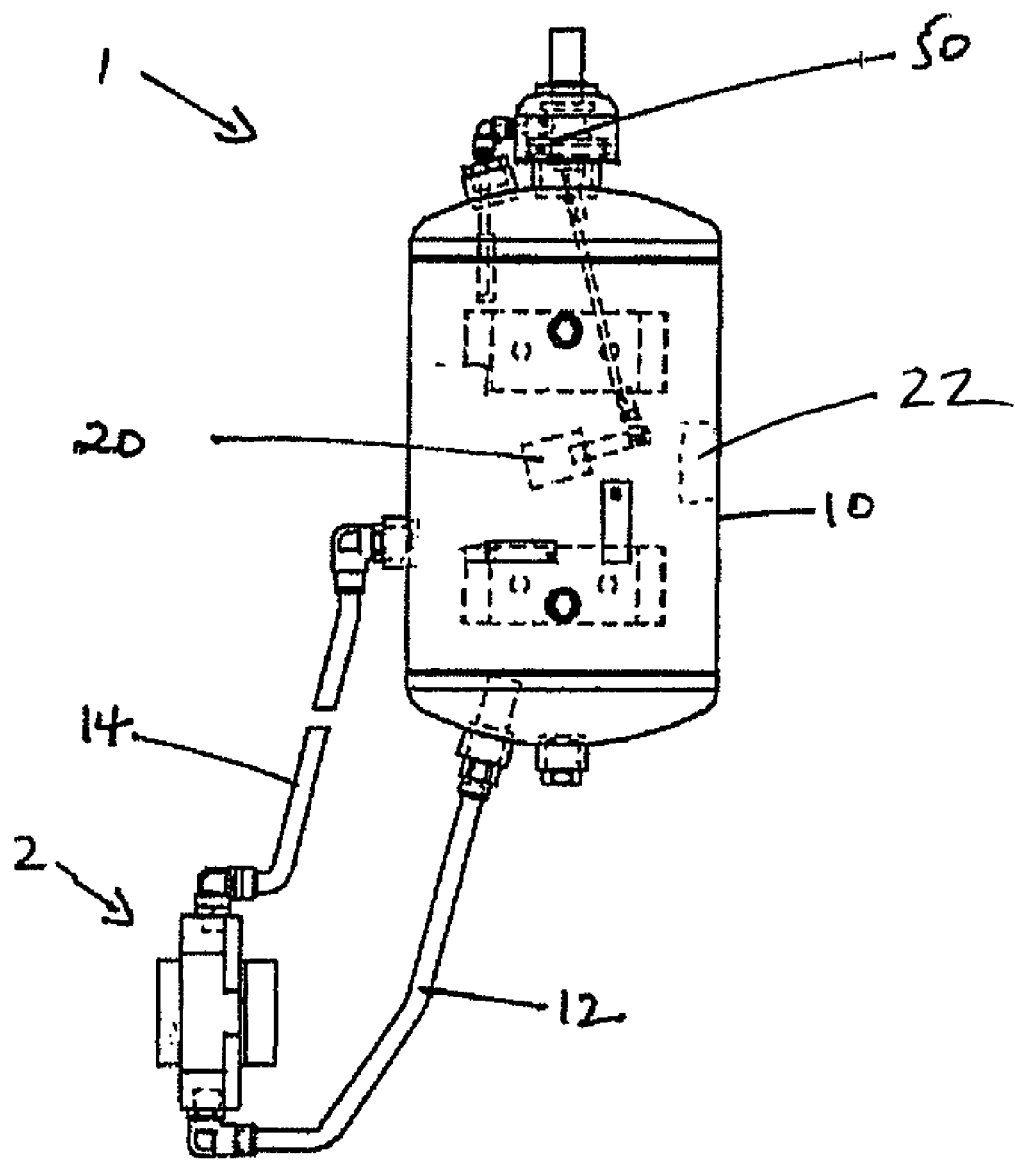
FIG. 1 depicts an embodiment of a seal support system according to the present invention having a float to detect barrier fluid levels and a ball-cock valve.

FIGS. 1 to 5 depict a seal support system (1) for maintaining barrier fluid in a mechanical seal (2) according to the invention.

The seal support system (1) comprises a vessel (10) which retains a quantity of barrier fluid. The vessel (10) is connected to the mechanical seal (2) by a feed pipe (12) and a return pipe (14) using the appropriate pipe connectors (not shown). A "loop" or "circuit" is formed such that barrier fluid is drawn from the vessel (10) into the mechanical seal (2) and then flows from the mechanical seal (2) into the vessel (10).

The size of the vessel (10) is selected in accordance with the mechanical seal assembly, which in turn depends on the type of pump, mixer or rotating equipment in which the mechanical seal is fitted, as will be understood by the person skilled in the art.

Figure 2:
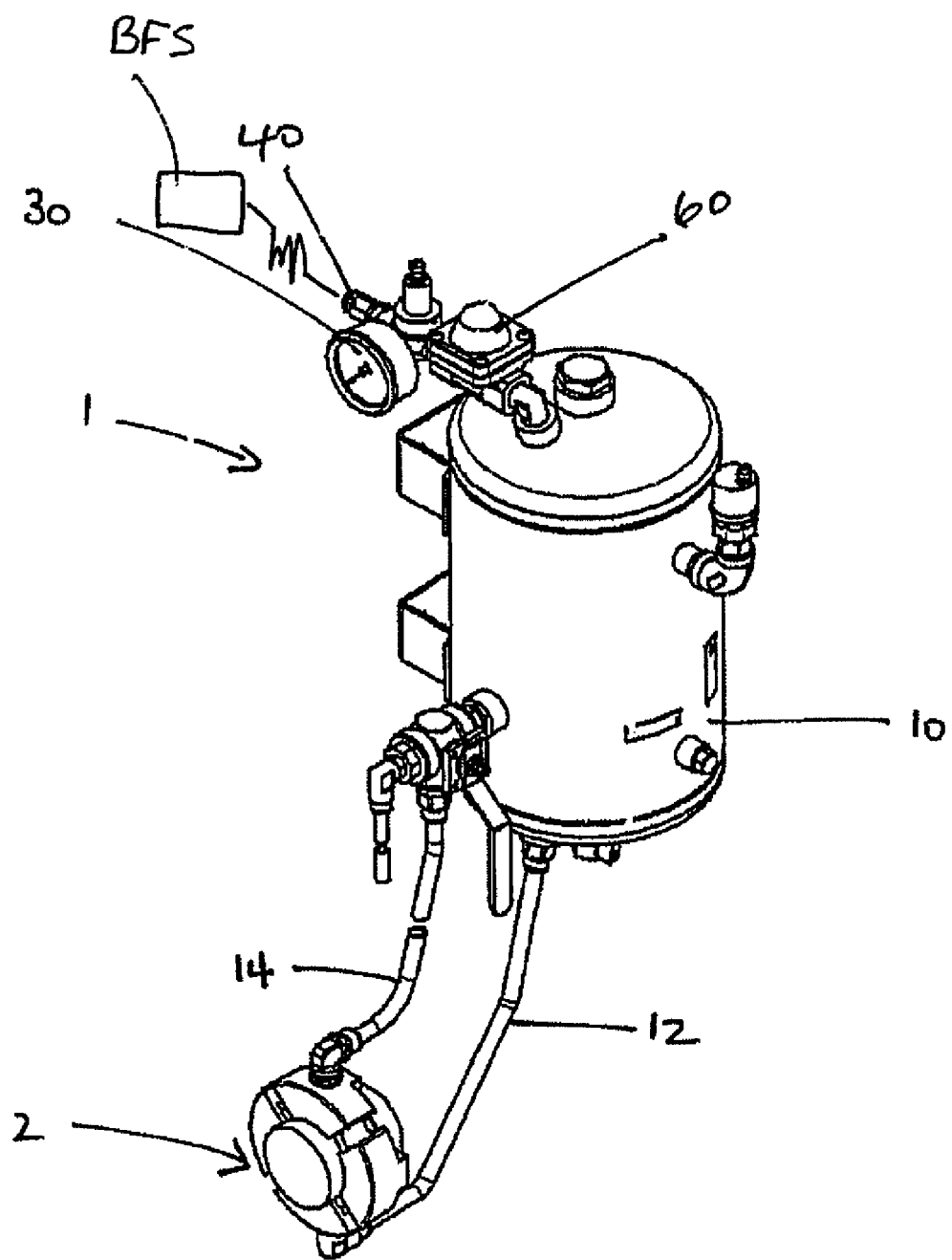
FIG. 2 depicts a second embodiment of a seal support system according to the present invention having a pressure gauge to detect barrier fluid pressure.

The vessel (10) is preferably arranged at a higher level with respect to the mechanical seal (2), as shown in FIGS. 1 and 2. Such an arrangement ensures that barrier fluid flows into the mechanical seal (2) from the vessel (10) under the force of gravity. Furthermore, the return pipe (14) is preferably connected to the vessel at a higher level with respect to the feed pipe (12). For example, FIGS. 1 and 2 depict an arrangement where the feed pipe (12) is connected to a bottom portion of the vessel (10) and the return pipe (14) is connected to a side portion of the vessel (10). Such an arrangement ensures that colder and so more dense barrier fluid is fed to the mechanical seal (2). A thermal loop is created as the barrier fluid is heated by the mechanical seal (2). Due to the thermosyphon effect, the heated and therefore less dense barrier fluid flows along the return pipe back into the vessel due to the change in density. The barrier fluid cools in the vessel (10). Cooling means may be provided to help increase the rate of cooling. For example, the seal support system (1) may comprise finned tubing or means to blow air over the heated barrier fluid. Alternatively, a heat exchanger may be arranged between the mechanical seal (2) and vessel (10) to cool barrier fluid prior to re-entering the vessel (10).

Any type of barrier fluid media may be employed in the invention. The barrier fluid may comprise water, since it is compatible with a vast variety of products. However, the barrier fluid may alternatively comprise oil. The barrier fluid is chosen in accordance with the type of equipment in which the mechanical seal is mounted, the industry in which the mechanical seal is being used and products being processed etc, as will be understood by a person skilled in the art.

The barrier fluid may, but not necessarily, be provided under pressure. The barrier fluid may be pressurized so that it is forced between the seal faces of the mechanical seal (2). The barrier fluid may be pressurized to a higher pressure than the product so that if there is any leakage across the mechanical seals, the barrier fluid leaks into the product rather than the product leaking into the barrier fluid. For example, water may be pressurised so that it leaks at a very slow rate between the seal faces into a food product.

The seal support system (1) comprises means for automatically detecting barrier fluid within the vessel (10). The detection means may detect the level of barrier fluid in the vessel (10) or the detection means may alternatively detect the pressure of barrier fluid within the vessel (10), especially if the barrier fluid is provided under pressure.

Detecting means for detecting the level of barrier fluid determine when the level of the barrier fluid departs from or varies with respect to a predetermined level. The predetermined level may be the optimum level of barrier fluid in the vessel for optimum lubrication and cooling of the mechanical seal. The predetermined level may alternatively be the minimum level of barrier fluid required in the vessel for sufficient lubrication and cooling of the mechanical seal. The means for detecting the level of barrier fluid may be mechanical or electrical. The level of the baffier fluid may be detected using a float (20) that sits on the surface of the barrier fluid, as shown in FIG. 1. The float (20) is affanged such that it automatically moves up and down as the level of the baffier fluid in the vessel (10) varies. The system may alternatively comprise a laser or photoelectric device for measuring the level of the barrier fluid. Alternatively, the detecting means may comprise electrical means (22), such as electrodes, probes or other suitable electrical fluid sensitive detecting means to means the baffier fluid level. Such measuring means are preferably mounted vertically along the inside wall of the vessel.

Detecting means for detecting the pressure of barrier fluid within the vessel (10) determine when the pressure departs from or varies with respect to a predetermined pressure. The predetermined pressure may be the optimum pressure of barrier fluid in the vessel for optimum lubrication and cooling of the mechanical seal. The predetermined pressure may alternatively be the minimum pressure of barrier fluid required in the vessel to sufficiently lubricate and cool the mechanical seal. The means for detecting the pressure of barrier fluid in the vessel may be mechanical or electrical. The means for detecting pressure may comprise a conventional mechanically operated pressure gauge (30), as shown in FIG. 2. Alternatively, the detecting means may comprise electrical means such as electrodes, probes, sensors or other suitable electrical pressure sensitive detecting means to measure the pressure of barrier fluid.

The seal support system (1) comprises means for restoring the barrier fluid in the vessel (10). Depending on the nature of the detecting means, the barrier fluid is either restored to the predetermined level or the predetermined pressure. The barrier fluid is may be restored to the optimum level or pressure or the minimum level or pressure. The restoring means automatically regulate the barrier fluid in the vessel in accordance with the values detected by the detecting means. The restoring means may automatically restore the level of barrier fluid to the predetermined level in response to the level of fluid detected in the vessel (10). The restoring means may alternatively automatically restore the pressure of barrier fluid to the predetermined pressure in response to the pressure detected in the vessel (10).

The means for restoring the barrier fluid level comprises means for supplying barrier fluid from a barrier fluid source (BFS) to the vessel (10). Barrier fluid may be supplied from the barrier fluid source under pressure. FIG. 2 shows how the vessel is connected to inlet means (40) to supply barrier fluid from the barrier fluid source. If the barrier fluid is water then the barrier fluid source is preferably a mains water supply.

The means for restoring the barrier fluid further includes a valve. The valve is used to control the flow of barrier fluid from the barrier fluid source into the vessel. The valve is arranged within the inlet means (40) between the barrier fluid source and the vessel (10). The valve is configured to open and close in response to the detected barrier fluid level or pressure.

If the barrier fluid is detected as being below the predetermined level then the valve opens allowing barrier fluid to flow from the source into the vessel (10). The barrier fluid may flow under pressure from the barrier fluid source. Barrier fluid may subsequently flow into the mechanical seal and the valve closes when the barrier fluid in the vessel reaches the predetermined level. The valve remains closed if the detection means detect the barrier fluid level as being at or above the predetermined level. The valve only re-opens if the barrier fluid level drops below the predetermined level. The means for detecting the level of barrier fluid and valve are connected such that the valve opens and closes in response to the detected barrier fluid level. The valve may be a mechanical valve, for example a ball-cock mechanism (50). FIG. 1 depicts an embodiment of the invention where the means for detecting the barrier fluid level is a float (20) connected to a ball-cock type valve (50). Alternatively, the valve may be an electrical valve and controlled (i.e. opened and closed) in accordance with the electrical detecting means. For example, the valve may be a solenoid valve electrically connected to electrodes, probes etc.

If the barrier fluid is detected as being below the predetermined pressure then the valve opens allowing barrier fluid to flow under pressure from the barrier fluid source into the vessel (10). The barrier fluid may subsequently flow into the mechanical seal (2). The valve closes when the pressure of the barrier fluid within the vessel reaches the predetermined pressure. The valve remains closed if the detection means detect the pressure within the vessel as being at or above the predetermined pressure. The valve will only re-open if the barrier fluid within the vessel drops below the predetermined pressure. The means for detecting the pressure of barrier fluid and valve are connected such that the valve opens and closes in response to the detected pressure. The valve may be a mechanical operated valve (60) and interconnected to a mechanically operated pressure gauge (30), as shown in FIG. 2. Alternatively, the valve may be electrically controlled and electrically connected to electronic pressure detection means. For example, the valve may be a solenoid valve electrically connected and controlled by electronic pressure sensors.

Figure 3:
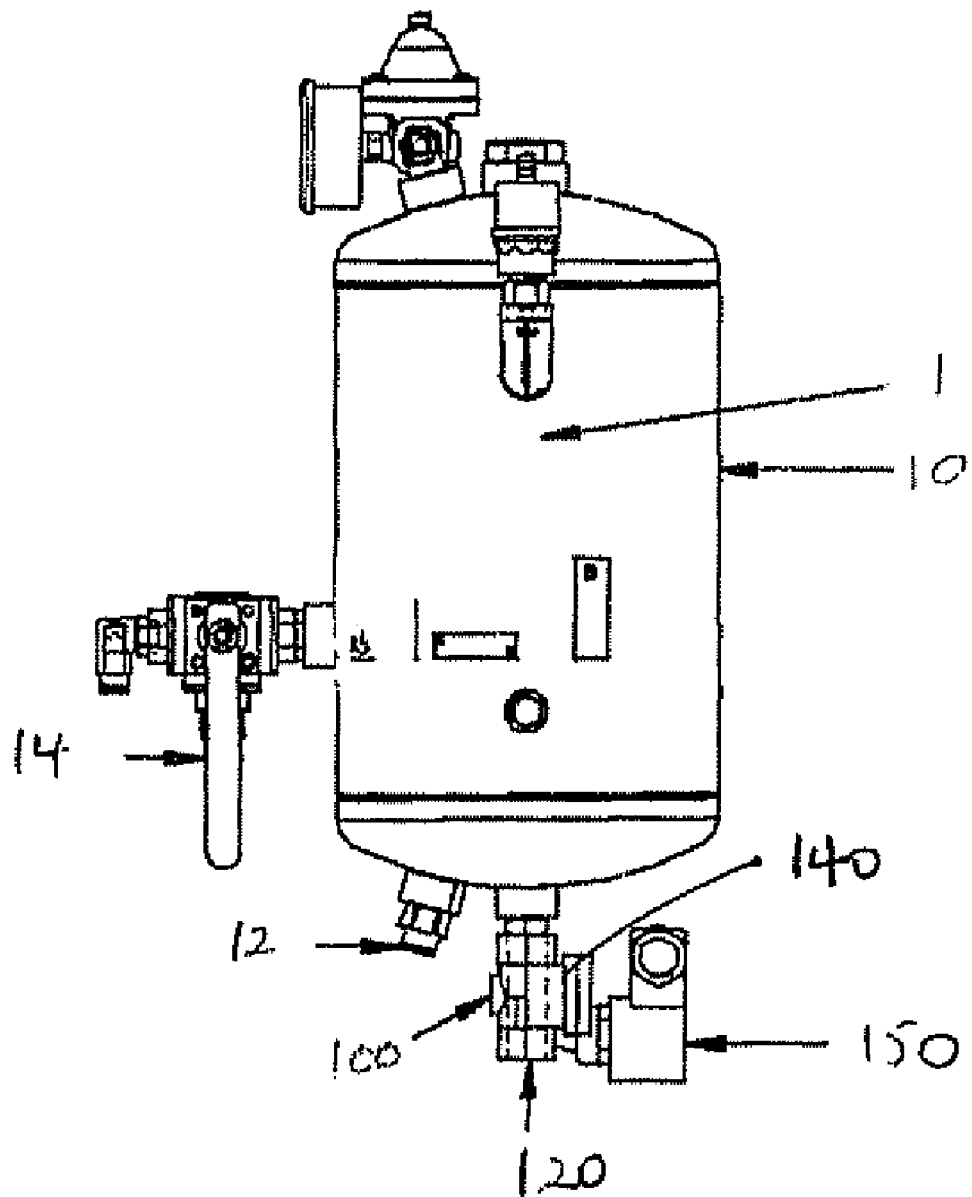
FIG. 3 depicts a third embodiment of a seal support system according to the present invention having discharging means with a programmable timer.
Figure 5:
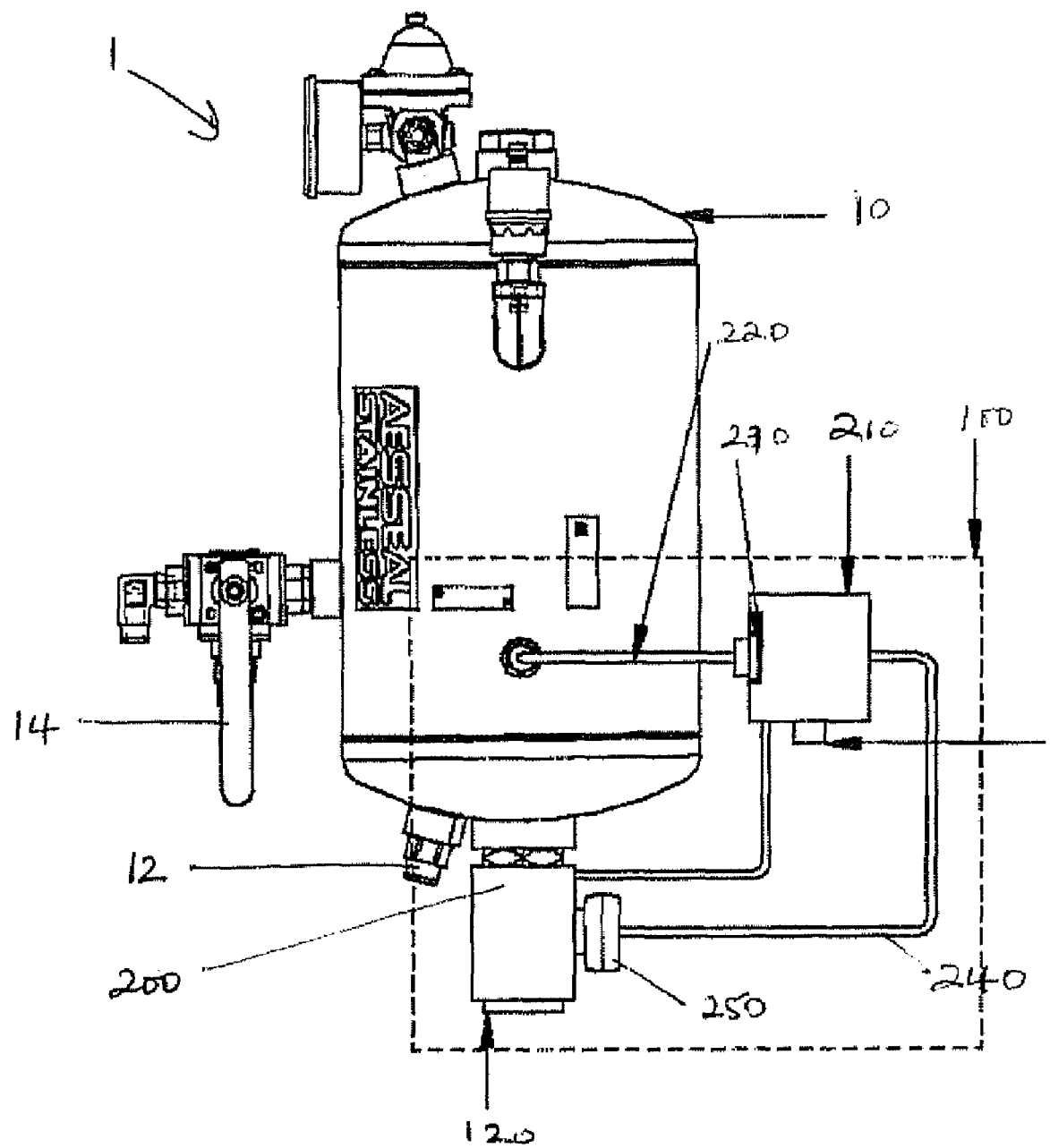
FIG. 5 depicts a fourth embodiment of a seal support system according to the present invention having hydraulically controlled discharging means.

The seal support system (1) according to the present invention also comprises means for discharging barrier fluid (100) from the vessel after a predetermined period of time. FIGS. 3 and 5 show the vessel connected to an outlet means (120) to discharge barrier fluid. The outlet means is preferably arranged in the lower or bottom portion of the vessel (10). The discharging means (100) further comprise a valve for controlling the flow of barrier fluid through the outlet means. The valve is controlled such that it opens after a predetermined period of time. Hence, barrier fluid is automatically discharged, drained or flushed from the vessel at specified time intervals. The valve is controlled such that barrier fluid is drained from the vessel with sufficient regularity to substantially prevent or reduce the deleterious effects of stagnant barrier fluid, pathogens and/or contaminants. The discharging means (100) automatically regulates the barrier fluid by using the valve to discharge, drain or flush out barrier fluid as often as required. This may be dependent on the type of barrier fluid, the operating conditions, the type of mechanical seal and/or the product being processed etc, as will be understood by a person skilled in the art. For example, the valve may be controlled such that it opens one or more times a day, one or more times a week etc.

As the barrier fluid is discharged from the vessel, the detection means will detect a drop in barrier fluid level or pressure. When the barrier fluid drops below the predetermined value, the restoring means are activated to automatically re-fill the vessel with new or fresh barrier fluid. The restoring means control the re-filling of the vessel such that fresh barrier fluid flows into the vessel until it reaches the predetermined pressure or level.

The discharging means preferably drains barrier fluid from the vessel (10) with a predetermined rate of discharge. The discharge valve may be chosen or controlled such that the rate of discharge through the outlet pipe is greater than the rate of flow of fresh barrier fluid through the inlet pipe. Hence, the draining or flushing action is quicker than the re-filling action. The valve may be alternatively chosen or controlled such that the rate of discharge through the outlet pipe is substantially equal to the rate of flow of fresh barrier fluid through the inlet pipe. Hence, there is no considerable pressure loss within the vessel (10).

The discharging means preferably drains barrier fluid from the vessel for a predetermined period of time. The discharge valve is preferably controlled such that it automatically closes after a predetermined period of time. The valve is controlled to stay open for specific lengths of time such that a sufficient quantity of barrier fluid is discharged from the vessel in order to help substantially prevent or reduce the effects of stagnation, pathogen growth or contaminates. The predetermined periods of time may be dependent on the size of vessel, the type of barrier fluid, the type of product being processed and/or the flow rate of barrier fluid through the valve etc, as will be understood by a person skilled in the art. The valve may be controlled to remain open for a certain period of time such that a specific quantity or all the barrier fluid initially retained in the vessel is discharged or drained. The valve may be alternatively controlled such that all the barrier fluid initially retained in the vessel is discharged and then fresh barrier fluid is flushed through the vessel and further discharged. The flushing through of new barrier fluid has a cleaning action and this helps further to overcome the problems associated with the prior art.

Figure 4:
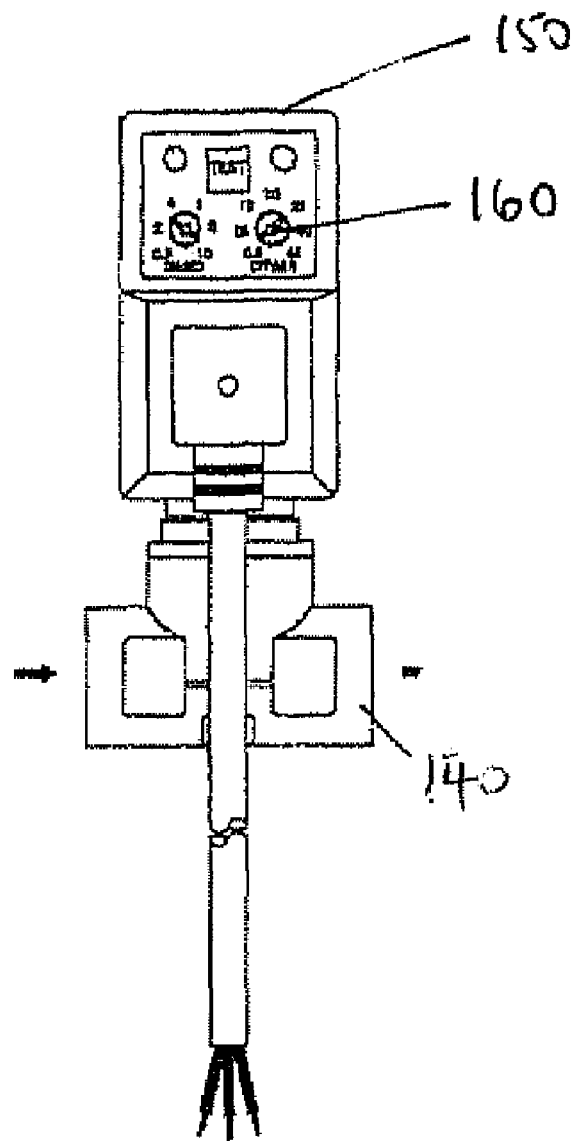
FIG. 4 depicts the programmable timer of the discharging means as shown in FIG. 3 electrically connected to a discharge valve.

The valve for discharging barrier fluid may be mechanically or electrically controlled. For example, the means for discharging barrier fluid may comprise electric control means for controlling an electrically operated valve, such as a solenoid valve (140) as depicted in FIGS. 3 and 4. The electric control means preferably comprises a programmable timer (150) electrically connected to the valve, automatically to control the opening and closing of the valve. The timer (150) may be programmed using manual input means (e.g. dials 160) or push buttons). Alternatively, the timer may be part of a computer programmable unit or processing means and programmable using software. The electric control means are programmed to open the valve after a requisite time interval. The electric control means may be further programmed to keep the valve open for a requite period of time and control the rate of flow of barrier fluid through the outlet means. The electronic control means may be located closely or remotely to the valve.

The means for discharging barrier fluid (100) may alternatively comprise mechanical control means for controlling a mechanically operated valve. The mechanical control means are configured to open the mechanical valve after a predetermined time interval. They may be further configured to close the mechanical valve after a predetermined period of time and optionally control the rate of flow of barrier fluid through the outlet means.

The mechanical control means may comprise a programmable timer mechanically connected to the mechanically operated valve so as to control the opening and closing of the valve. The timer is preferably programmed using manual input means.

The valve may be a mechanical valve under hydraulic control such as a hydraulically balanced valve. FIG. 5 depicts an embodiment of the invention where the discharge valve is a hydraulically balanced valve (200). The means for controlling the hydraulically balanced valve comprises a hydraulic chamber (210) arranged in fluid connection with the vessel using a feed pipe (220). The valve (200) is mechanically/hydraulically connected to both the vessel (10) and chamber (210) such that, when the pressure of barrier fluid within the vessel (10) and hydraulic chamber (210) is equalized, the valve (200) opens and barrier fluid is discharged or drained from the vessel via the outlet means (120). The hydraulic chamber (210) automatically controls the opening and closing of the hydraulically balanced valve (200). The hydraulic chamber (210) includes means, such as an orifice plate (230), for controlling to rate of flow of fluid from the vessel (10) into the hydraulic chamber (210). Hence, the time it takes for sufficient barrier fluid to flow into the hydraulic chamber (210) and reach an equalizing pressure may be controlled and predetermined. Accordingly, the hydraulically balanced valve (200) is regulated to open after a specific period of time. For example, the hydraulic chamber (210) and orifice plate (230) may be selected such that the hydraulically balanced valve (200) is opened every 24 hours. The hydraulic chamber (210) further comprises discharge means for draining barrier fluid from hydraulic chamber. The discharge means preferably comprise an outlet means (240) and valve (250). The valve may be a mechanically or electrically controlled valve. As the barrier fluid is discharged from the hydraulic chamber (210), the pressure within the hydraulic chamber (210) drops and the hydraulically balanced valve (200) closes. The discharging of barrier fluid from the hydraulic chamber (210) is preferably controlled such that the hydraulically balanced valve (200) is opened for a predetermined period of time.

The discharging means (100) helps to provide an automatic and self-regulating seal support system (1) for a mechanical seal (2). The discharging means (100) ensures the barrier fluid is regularly drained from the vessel (10). By doing so, the seal support systems (1) reduce or ameliorate the effects associated with the stagnation of barrier fluid, pathogens and/or contamination. There is no need for user input once the system has been arranged and pre-set in accordance with the requirements of the mechanical seal, product being processed and/or barrier fluid etc., as will be understood by a person skilled in the art Furthermore, no periodic adjustments are required to control the discharging of barrier fluid whilst the seal support system is operational. The system requires very little maintenance. Thus, the seal support system of embodiments of the invention may be considered to be an intelligent system.

Throughout the description and claims of this specification, the words "comprise" and "contain" and variations of the words, for example "comprising" and "comprises", means including but not limited to ", and is not intended to (and does not) exclude other moities, components, integers or steps.

Throughout, the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, moieties or groups described in conjunction with a particular aspect, embodiment or example of the invention are to be understood to be applicable to any other aspect embodiment or example described herein unless incompatible therewith.

We claim:

1. A seal support system for maintaining barrier fluid in a mechanical seal comprising:
a vessel for containing barrier fluid;
feeding means for feeding barrier fluid between the vessel and the mechanical seal;
detecting means for automatically detecting barrier fluid within the vessel;
restoring means for automatically restoring barrier fluid within the vessel and;
discharging means for automatically draining all the barrier fluid from the vessel after a predetermined period of time;
wherein the detecting means comprises means for automatically detecting a pressure of barrier fluid within the vessel and the restoring means comprises means for supplying barrier fluid under pressure from a barrier fluid source to the vessel when the pressure is below a predetermined pressure; wherein the discharging means periodically and automatically drains all of the barrier fluid from the vessel.

2. A seal support system according to claim 1, wherein the means for supplying barrier fluid comprises:
inlet means for feeding barrier fluid from the barrier fluid source to the vessel; and
a valve for automatically controlling the supply of barrier fluid from the barrier fluid source in response to the pressure of barrier fluid detected by the detecting means.

3. A seal support system according to claim 2, wherein the detecting means and the valve for controlling the supply of barrier fluid are interconnected electrical devices.

4. A seal support system according to claim 3, wherein the discharging means is configured to automatically drain barrier fluid from the vessel for a predetermined period of time.

5. A seal support system according to claim 4, wherein the discharging means is configured to automatically drain barrier fluid from the vessel at a predetermined rate of discharge.

6. A seal support system according to claim 5, wherein the discharging means comprises:
outlet means for draining barrier fluid from the vessel; and
a valve for automatically controlling the draining of barrier fluid from the vessel.

7. A seal support system according to claim 6, wherein the valve for automatically controlling the draining of barrier fluid is an electrically controlled valve and the discharging means further comprises electric control means to control the operation of the valve.

8. A seal support system according to claim 7, wherein the electric control means comprises a programmable timer, electrically connected to the valve for automatically controlling the draining of barrier fluid, to automatically control the opening and closing of the valve.

9. A seal support system according to claim 6, wherein the valve for automatically controlling the draining of barrier fluid is a mechanically controlled valve and the discharging means further comprises mechanical control means to control the operation of the valve.

10. A seal support system according to claim 9, wherein the mechanical control means comprises a programmable timer, mechanically connected to the valve for automatically controlling the draining of the barrier fluid, to automatically control the opening and closing of the valve.

11. A seal support system according to claim 9, wherein the mechanically controlled valve is a hydraulically balanced valve and the mechanical control means comprises a hydraulic chamber to automatically control the opening and closing of the hydraulically balanced valve and arranged in fluid connection with the vessel; means for controlling the rate of flow of barrier fluid into the hydraulic chamber from the vessel; and discharging means for discharging barrier fluid from the hydraulic chamber.

* * * * *